No. 612,806. Patented Oct. 18, 1898.
D. MUGRAUER & P. TOTZAUER.
DISH COMPOSED OF CANDY.
(Application filed Dec. 21, 1897.)

(No Model.)

Witnesses:
H. B. Hallock
R. M. Pierce

Inventors:
Dismas Mugrauer
Peregrin Totzauer
by S. J. Williamson
Attorney

UNITED STATES PATENT OFFICE.

DISMAS MUGRAUER AND PEREGRIN TOTZAUER, OF PHILADELPHIA, PENNSYLVANIA.

DISH COMPOSED OF CANDY.

SPECIFICATION forming part of Letters Patent No. 612,806, dated October 18, 1898.

Application filed December 21, 1897. Serial No. 662,843. (No model.)

*To all whom it may concern:*

Be it known that we, DISMAS MUGRAUER and PEREGRIN TOTZAUER, citizens of the United States, residing at Philadelphia, in the county of Philadelphia and State of Pennsylvania, have invented a certain new and useful Improvement in Eating Utensils, of which the following is a specification.

Our invention relates to a new article of manufacture, and has for its object to provide a plate and spoon for picnics and like purposes, which after the contents thereof have been disposed of by eating or otherwise the plate and spoon themselves may be eaten.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming part of this specification, in which—

Figure 1:
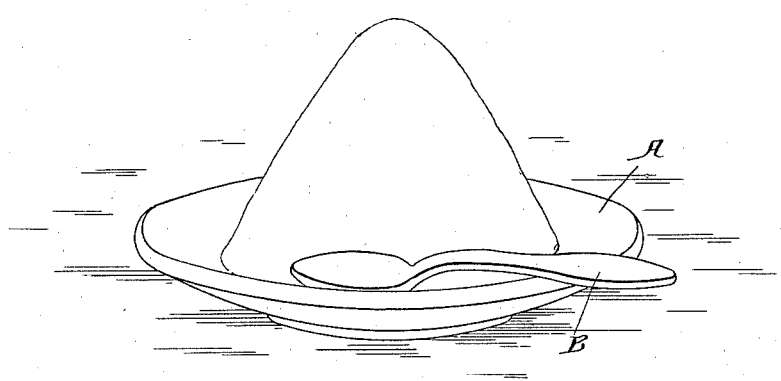
Figure 2:
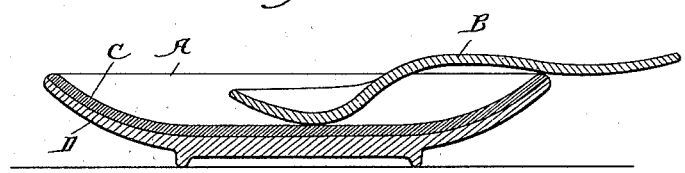

Figure 1 represents a plate and spoon made in accordance with our improvement, showing the former as containing ice-cream; and Fig. 2, a section thereof.

In carrying out our invention as here embodied we form a plate A in any suitable design or size of an impervious candy and likewise the spoon B, so that when the contents of the plate have been eaten the plate and spoon themselves may also be eaten.

Of course we do not wish to limit ourselves to any particular kind of candy of which the plate is to be made, since this may be varied to suit the taste of the user.

It is obvious that in the use of the plates and spoons made in accordance with our improvement a great convenience is had, especially for picnic parties, since the plate and spoon will not only form a distinctive feature, but when ice-cream or the like has been eaten therefrom the plate itself will form part of the dessert and may be so flavored as to make it exceedingly palatable, thus avoiding the necessity of cleansing the remaining plates and spoons and transporting them to a place of destination.

If desired, the plate may be made of two layers C and D, the upper layer being of such nature as to prevent disintegration of the plate from the effect of the contents, while the inner layer may be of a more easily affected nature, so that in consuming the contents of the plate this layer may also be removed and eaten therewith—as, for instance, the outer portion D of the plate may be of hard impervious candy, while the inner section C may be of chocolate or cream, so that in the process of eating ice-cream from such a plate this material may be eaten therewith.

Having thus fully described this invention, what we claim is—

1. As a new article of manufacture, a dish composed of candy arranged in two layers, the outer layer being formed of material not easily disintegrated by moisture, the inner layer being readily softened by moisture, as and for the purpose described.

2. As a new article of manufacture, a plate made of an outer layer of candy capable of resisting disintegration from moisture, and an inner layer of candy of such nature as to be easily affected by the contents of the plate and capable of being removed by a spoon or the like, as specified.

In testimony whereof we have hereunto affixed our signatures in the presence of two subscribing witnesses.

DISMAS MUGRAUER.
    PEREGRIN TOTZAUER.

Witnesses:
 HY. ABELES,
 MARTHA ABELES.